US 8,175,656 B2

(12) United States Patent
Beith

(10) Patent No.: US 8,175,656 B2
(45) Date of Patent: May 8, 2012

(54) SYSTEM AND METHOD OF DISPLAYING INCOMING COMMUNICATION ALERTS AT A WIRELESS DEVICE

(75) Inventor: Scott D. Beith, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1219 days.

(21) Appl. No.: 11/361,157

(22) Filed: Feb. 24, 2006

(65) Prior Publication Data

US 2007/0202925 A1  Aug. 30, 2007

(51) Int. Cl.
*H04M 1/00* (2006.01)
(52) U.S. Cl. ........................ 455/567; 455/566
(58) Field of Classification Search .......... 455/566–567, 455/556.2, 401, 415–417; 379/93.35, 142.06, 379/164; 348/14.02, 14.03, 14.07, 14.08, 348/14.1; 709/204; 370/259–260
See application file for complete search history.

(56) References Cited

U.S. PATENT DOCUMENTS

| 5,907,604 | A  | * | 5/1999  | Hsu .......................... 379/142.06 |
| 7,155,211 | B2 | * | 12/2006 | Mun et al. ..................... 455/415 |
| 7,245,941 | B2 | * | 7/2007  | Scott ............................. 455/566 |
| 7,286,821 | B2 | * | 10/2007 | Kraft et al. .................... 455/415 |
| 7,460,664 | B2 | * | 12/2008 | Satoh ....................... 379/420.02 |
| 7,502,450 | B2 | * | 3/2009  | Sakai et al. ................ 379/93.35 |
| 7,509,148 | B1 | * | 3/2009  | Pisutha-Arnond et al. ... 455/567 |
| 2003/0153337 | A1 | * | 8/2003 | Ito ................................. 455/517 |
| 2004/0142708 | A1 | * | 7/2004 | Asada et al. .................. 455/466 |
| 2007/0036128 | A1 | * | 2/2007 | Mori ............................. 370/352 |
| 2007/0066310 | A1 | * | 3/2007 | Haar et al. ..................... 455/445 |
| 2007/0093235 | A1 | * | 4/2007 | Kimbrell .................... 455/412.1 |
| 2007/0203986 | A1 | * | 8/2007 | Krishnan ..................... 709/206 |

* cited by examiner

*Primary Examiner* — Brandon Miller
(74) *Attorney, Agent, or Firm* — Robert J. O'Connell; James T. Hagler

(57) ABSTRACT

A method of providing an alert of an incoming communication is disclosed and includes receiving an incoming communication at a wireless device and determining whether the wireless device has access to a photograph that is associated with an identified source of the incoming communication. Further, the method includes displaying the photograph and an alert message that is associated with the incoming communication.

33 Claims, 13 Drawing Sheets

SYSTEM AND METHOD OF DISPLAYING INCOMING COMMUNICATION ALERTS AT A WIRELESS DEVICE

BACKGROUND

I. Field

The present disclosure generally relates to wireless devices. More particularly, the disclosure relates to caller identification at wireless devices.

II. Description of Related Art

Advances in technology have resulted in smaller and more powerful wireless devices. For example, there currently exist a variety of wireless devices, including mobile phones, personal digital assistants (PDAs), laptops, and paging devices that are small, lightweight, and easily carried by users. These devices may include the ability to transmit voice and/or data over wireless networks. Further, many such wireless devices provide significant computing capabilities, and as such, are becoming tantamount to small personal computers and handheld PDAs.

Typically, these smaller and more powerful wireless devices are often resource constrained. For example, the screen size, the amount of available memory and file system space, and the amount of input and output capabilities may be limited by the small size of the device. Because of such severe resource constraints, it is can be desirable to maintain a limited size and quantity of software applications and other information residing on such wireless devices.

Some of these wireless devices utilize application programming interfaces (APIs) that are sometimes referred to as runtime environments and software platforms. The APIs can be installed onto a wireless device to simplify the operation and programming of such wireless devices by providing generalized calls for device resources. Further, some APIs can provide software developers the ability to create software applications that are executable on such wireless devices. In addition, APIs can provide an interface between a wireless device system hardware and the software applications. As such, the wireless device functionality can be made available to the software applications by allowing the software to make a generic call for a function thus not requiring the developer to tailor its source code to the individual hardware or device on which the software is executing. Further, some APIs can provide mechanisms for secure communications between wireless devices, such as client devices and server systems, using secure cryptographic key information.

Examples of such APIs, some of which are discussed in more detail below, include those currently publicly available versions of the Binary Runtime Environment for Wireless® (BREW®) platform, developed by Qualcomm, Inc. of San Diego, Calif. The BREW® platform can provide one or more interfaces to particular hardware and software features found on wireless devices.

Further, the BREW® platform can be used in an end-to-end software distribution system to provide a variety of benefits for wireless service operators, software developers and wireless device manufacturers and consumers. One such currently available end-to-end software distribution system, called the BREW® solution developed by QUALCOMM Incorporated, includes logic distributed over a server-client architecture, wherein the server can perform billing, security, and application distribution functionality, and wherein the client can perform application execution, security and user interface functionality.

Many wireless telephones can also be used to take digital pictures. Further, one type of software feature included in many wireless telephones is a photograph manager. The photograph manager can be used to manage photographs taken by the wireless telephone or received at the wireless telephone. A caller identification feature is available that displays an image associated with an identified caller when an identified incoming call is received. Unfortunately, the display of the image associated with the identified caller is fleeting and oftentimes does not last long enough for the user of the wireless telephone to view the image.

Accordingly it would be advantageous to provide an improved system and method of providing call notification at a wireless device.

SUMMARY

A method of providing an alert of an incoming communication is disclosed and includes receiving an incoming communication at a wireless device and determining whether the wireless device has access to a photograph that is associated with an identified source of the incoming communication. Further, the method includes displaying the photograph and an alert message that is associated with the incoming communication.

In a particular embodiment, a default idle screen background is replaced with the photograph and the alert message. Also, in a particular embodiment, the alert message is displayed over at least a portion of the photograph. The alert message can indicate that the incoming communication is received. Alternatively, the alert message can indicate that the incoming communication has been missed. In a particular embodiment, the incoming communication can includes a telephone call, a text message, an email message, a picture message, or a video message.

In a particular embodiment, the method also includes displaying at least one soft button that is associated with the alert message. The soft button can be displayed over a portion of the photograph. Additionally, a portion of the soft button can be substantially transparent. In a particular embodiment, the soft button can be a yes soft button, a no soft button, a send soft button, a cancel soft button, an exit soft button, a call soft button, a call home soft button, a call cell soft button, or a call work soft button.

In yet another particular embodiment, the method includes determining whether the alert message is acknowledged. The alert message can be acknowledged by answering the incoming communication. Further, the alert message can be acknowledged by viewing the incoming communication. Also, the alert message can be acknowledged by viewing information that is associated with a missed incoming communication.

In still another particular embodiment, the method includes clearing the alert message after the alert message is acknowledged, clearing the at least one soft button, and displaying a default idle screen background.

In another embodiment, a method of establishing a telephone call is provided and includes receiving a selection of a photograph and replacing a default idle screen background with the photograph at a display of a wireless device. Further, the method includes displaying at least one call soft button over the photograph and dialing a telephone number that is associated with the photograph when the at least one call soft button is selected.

In yet another embodiment, a method of text messaging is disclosed and includes receiving a selection of a photograph of a person and replacing a default idle screen background with the photograph. Also, the method includes displaying a text input window over the photograph and displaying at least one text messaging soft button over the photograph. The method also includes transmitting a text message to a device that is associated with the person within the photograph.

In still another embodiment, a wireless device is provided and includes a processor, a computer readable medium that is accessible to the processor, and a computer program that is embedded within the computer readable medium. The computer program includes instructions to receive an incoming communications at a wireless device, instructions to determine whether the wireless device has access to a photograph that is associated with an identified source of the incoming communication, and instructions to display the photograph and an alert message that is associated with the incoming communication.

In yet still another embodiment, a wireless device is provided and includes a processor, a computer readable medium that is accessible to the processor, and a computer program that is embedded within the computer readable medium. The computer program includes instructions to receive a selection of a photograph, instructions to replace a default idle screen background with the photograph at a display of a wireless device, instructions to display at least one call soft button over the photograph, and instructions to dial a telephone number that is associated with the photograph when the at least one call soft button is selected.

In yet another embodiment, a wireless device is provided and includes a processor, a computer readable medium that is accessible to the processor, and a computer program that is embedded within the computer readable medium. The computer program includes instructions to receive a selection of a photograph of a person, instructions to replace a default idle screen background with the photograph, instructions to display a text input window over the photograph, instructions to display at least one text messaging soft button over the photograph, and instructions to transmit a text message to a device that is associated with the person within the photograph.

In another embodiment, a computer program is disclosed. The computer program is embedded within a computer readable medium and includes instructions to receive an incoming communication at a wireless device, instructions to determine whether the wireless device has access to a photograph that is associated with an identified source of the incoming communication; and instructions to display the photograph and an alert message that is associated with the incoming communication.

In still another embodiment, a computer program is disclosed. The computer program is embedded within a computer readable medium and includes instructions to receive a selection of a photograph, instructions to replace a default idle screen background with the photograph at a display of a wireless device, instructions to display at least one call soft button over the photograph, and instructions to dial a telephone number that is associated with the photograph when the at least one call soft button is selected.

In yet another embodiment, a computer program is disclosed. The computer program is embedded within a computer readable medium and includes instructions to receive a selection of a photograph of a person, instructions to replace a default idle screen background with the photograph, instructions to display a text input window over the photograph, instructions to display at least one text messaging soft button over the photograph, and instructions to transmit a text message to a device that is associated with the person within the photograph.

In another embodiment, a wireless device is disclosed and includes means for receiving an incoming communication at a wireless device, means for determining whether the wireless device has access to a photograph that is associated with an identified source of the incoming communication, and means for displaying the photograph and an alert message associated with the incoming communication.

In still another embodiment, a wireless device is disclosed and includes means for receiving a selection of a photograph, means for replacing a default idle screen background with the photograph at a display of a wireless device, means for displaying at least one call soft button over the photograph, and means for dialing a telephone number that is associated with the photograph when the at least one call soft button is selected.

In yet another embodiment, a wireless device is disclosed and includes means for receiving a selection of a photograph, means for replacing a default idle screen background with the photograph, means for displaying a text input window over the photograph, means for displaying at least one text messaging soft button over the photograph, and means for transmitting a text message to a device that is associated with the photograph when the at least one text messaging soft button is selected.

In another embodiment, a method of providing an alert of an incoming communication is disclosed an includes receiving an incoming communication at a wireless device, determining whether the wireless device has access to a video associated with an identified source of the incoming communication, and displaying the video and an alert message associated with the incoming communication.

An advantage of one or more embodiments disclosed herein can include displaying an alert over a photograph that is associated with an incoming communication.

Another advantage can include replacing a default wallpaper with a photograph that is associated with an alert until the alert is cleared or acknowledged.

Yet another advantage can include establishing communication with a user by selecting a photograph that is associated with the user.

Still another advantage can include replacing a default wallpaper with a video that is associated with an alert until the alert is cleared or acknowledged.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. Further, many embodiments are described in terms of sequences of actions to be performed by, for example, elements of a wireless device. It will be recognized that various actions described herein could be performed by specific circuits, e.g., application specific integrated circuits (ASICs), by program instructions being executed by one or more processors, or by a combination of both.

Further, the embodiments described herein can additionally be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform a certain action or "code operable to" perform the described action. The following detailed description describes methods, systems, software and apparatus used in connection with one or more wireless devices.

In one or more embodiments, a wireless device may utilize a runtime environment, such as a version of the Binary Runtime Environment for Wireless® (BREW®) platform developed by QUALCOMM, Inc., of San Diego, Calif. In at least one embodiment in the following description, the system used to provide communications between wireless devices and servers is implemented on a wireless device executing a runtime environment, such as the current version of the BREW® platform. However, one or more embodiments of the system used to provide communications between wireless devices and servers are suitable for use with other types of runtime environments that, for example, operate to control the execution of applications on wireless devices.

Figure 1:
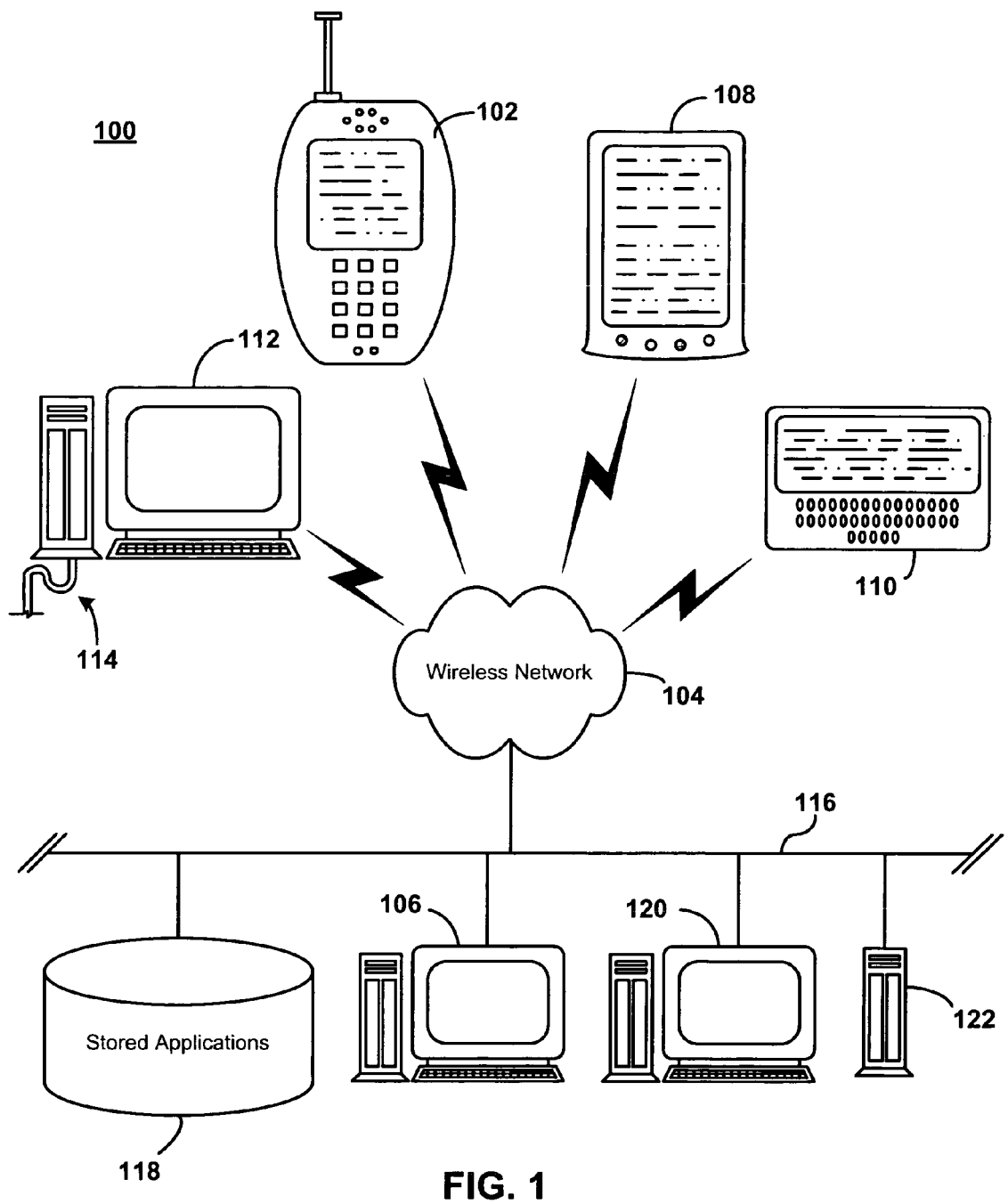
FIG. 1 is a general diagram of a particular embodiment of a system providing communications between wireless devices and a server.

FIG. 1 illustrates a block diagram of an exemplary, non-limiting embodiment of a system 100 that may perform loading, reloading, and deletion of software application components on a wireless device, such as wireless telephone 102. The wireless telephone 102 communicates across a wireless network 104 with at least one application server 106. Further, the application server 106 can selectively transmit one or more software applications and components to one or more wireless devices across a wireless communication portal or other node having data access to the wireless network 104.

As illustrated in FIG. 1, the wireless device can be a wireless telephone 102, a personal digital assistant 108, a pager 110, or a separate computer platform 112 that has a wireless communication portal. In a particular embodiment, the pager 110 can be a two-way text pager. Further, in an alternative embodiment, the wireless device can have a wired connection 114 to a network or the Internet. The exemplary, non-limiting system can include any form of a remote module including a wireless communication portal, including without limitation, wireless modems, PCMCIA cards, personal computers, access terminals, telephones with or without a display or keypad, or any combination or sub-combination thereof.

As depicted in FIG. 1, the application download server 106 is coupled to a network 116 with other computer elements in communication with the wireless network 104. The system 100 includes is a second server 120 and a stand-alone server 122, and each server can provide separate services and processes to the wireless devices 102, 108, 110, 112 across the wireless network 104. Further, as indicated in FIG. 1, the system 100 also includes at least one stored application database 118 that stores software applications that are downloadable by the wireless devices 102, 108, 110, 112. Different embodiments are contemplated that locate logic to perform secure communications at any one or more of the application download server 106, the second server 120 and the stand-alone server 122.

Figure 2:
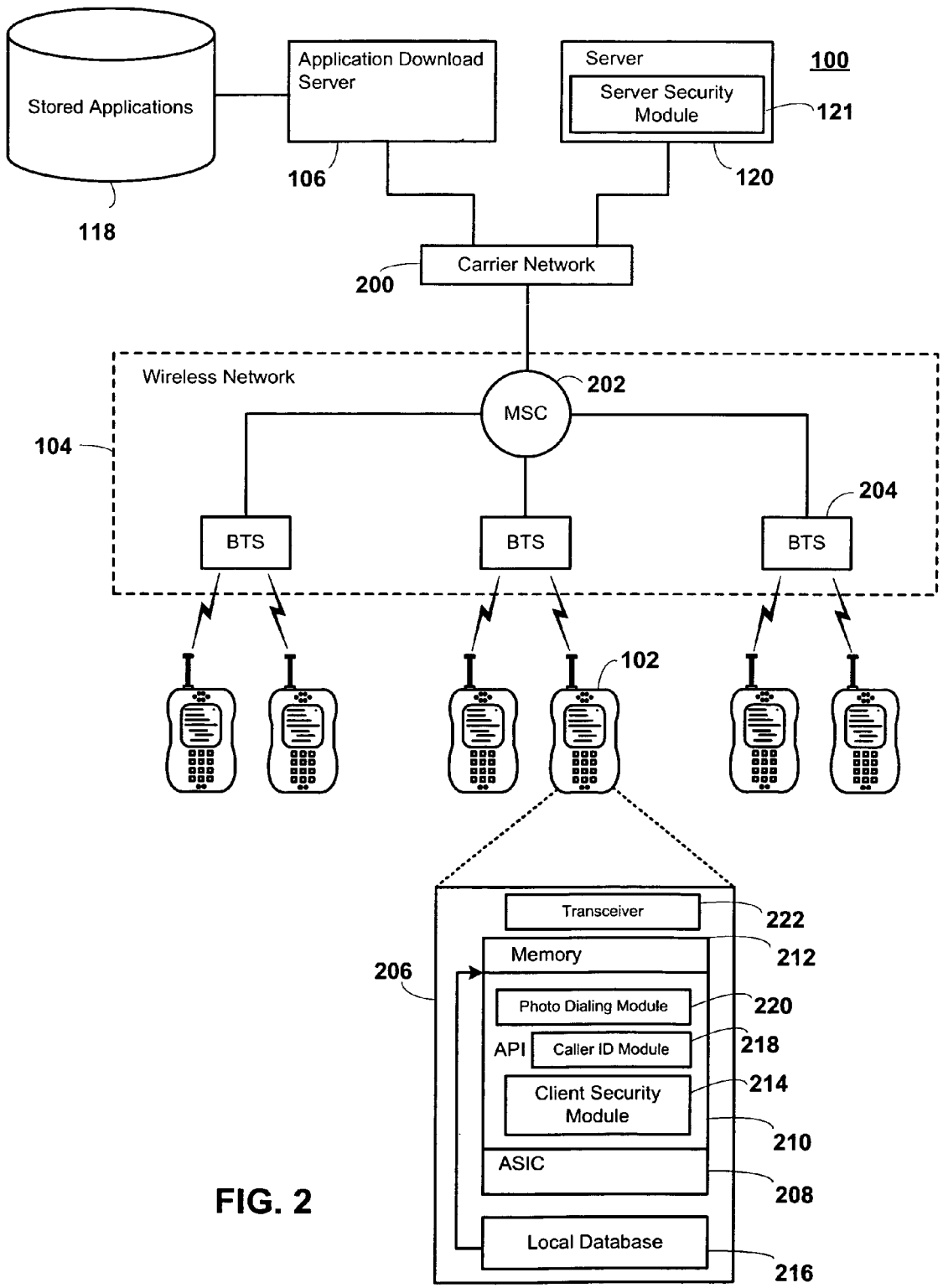
FIG. 2 is a general diagram that illustrates further details of the particular embodiment of the system of FIG. 1.

In FIG. 2, a block diagram is shown that more fully illustrates the system 100, including the components of the wireless network 104 and interrelation of the elements of the system 100. The system 100 is merely exemplary and can include any system whereby remote modules, such as the wireless devices 102, 108, 110, 112 communicate over-the-air between and among each other and/or between and among components connected via a wireless network 104, including, without limitation, wireless network carriers and/or servers. The application download server 106 and the stored application database 118, along with any other servers, such as server 120, are compatible with wireless communication services and can communicate with a carrier network 200 through a data link, such as the Internet, a secure LAN, WAN, or other network. In an illustrative embodiment, the server 120 contains a server security module 121 that further contains logic configured to provide for secure communications over the carrier network 200. In a particular embodiment, the server security module 121 can operate in conjunction with a client security module located on a wireless device, such as wireless devices 102, 108, 110, 112, to provide secure communications.

The carrier network 200 controls messages (sent as data packets) sent to a mobile switching center ("MSC") 202. The carrier network 200 communicates with the MSC 202 by a network, such as the Internet and/or POTS ("plain ordinary telephone system"). Typically, the network connection between the carrier network 200 and the MSC 202 transfers data, and the POTS transfers voice information. The MSC 202 is connected to multiple base transceiver stations ("BTS") 204. The MSC 202 can be connected to the BTS 204 by both a data network and/or Internet for data transfer and POTS for voice information. The BTS 204 ultimately broadcasts messages wirelessly to the wireless devices, such as to wireless telephone 102, by the short messaging service ("SMS"), or other over-the-air methods known in the art.

The wireless device 102 has a computer platform 206 that can receive and execute software applications transmitted from the application download server 106. The computer platform 206 may be implemented as an application-specific integrated circuit ("ASIC" 208), a processor, microprocessor, logic circuit, or other data processing device. The ASIC 208 is installed at the time of manufacture of the wireless device.

The ASIC 208 or other processor can execute an application programming interface ("API") 210 layer that interfaces with resident programs in the memory 212 of the wireless device. The memory 212 can be comprised of read-only or random-access memory (ROM or RAM), EEPROM, flash memory, or any other memory suitable for computer platforms.

The API 210 also includes a client security module 214 containing logic configured to provide for secure communications over the carrier network 200. In a particular embodiment, the client security module 214 can operate in conjunction with the server security module 121 to provide secure communications. As illustrated in FIG. 2, the computer platform 206 can further include a local database 216 that can hold applications not actively used in memory 212. In an illustrative embodiment, the local database 216 is stored within a flash memory cell, but it can be stored within any secondary storage device as known in the art, such as magnetic media, EEPROM, optical media, tape, or floppy or hard disk.

A wireless device, e.g., the wireless telephone 102, can download one or more software applications, such as games, news, stock monitors, and the like, from the application download server 106. Further, the wireless device can store the downloaded applications in the local database 216, when not in use, and can load stored resident applications from the local database 216 to memory 212 for execution by the API 210 when desired by the user. Further, communications over the wireless network 104 may be performed in a secure manner, at least in part, due to the interaction and operation of the client security module 214 and the server security module 121. As shown in FIG. 2, the API 210 can also include a caller identification module 218 and a photograph dialing module 220. In a particular embodiment, the caller identification module 218 and the photograph dialing module 220 can include logic, or instructions, that can be executed by a processor to perform one or more of the method steps described herein.

FIG. 2 also indicates that the wireless telephone 102 can include a transceiver 222 that can be coupled to the ASIC 208, or other processor. The transceiver 222 can be used to send and receive communications, e.g., telephone calls, text messages, email messages, picture messages, video messages, or other types of communications.

Figure 3:
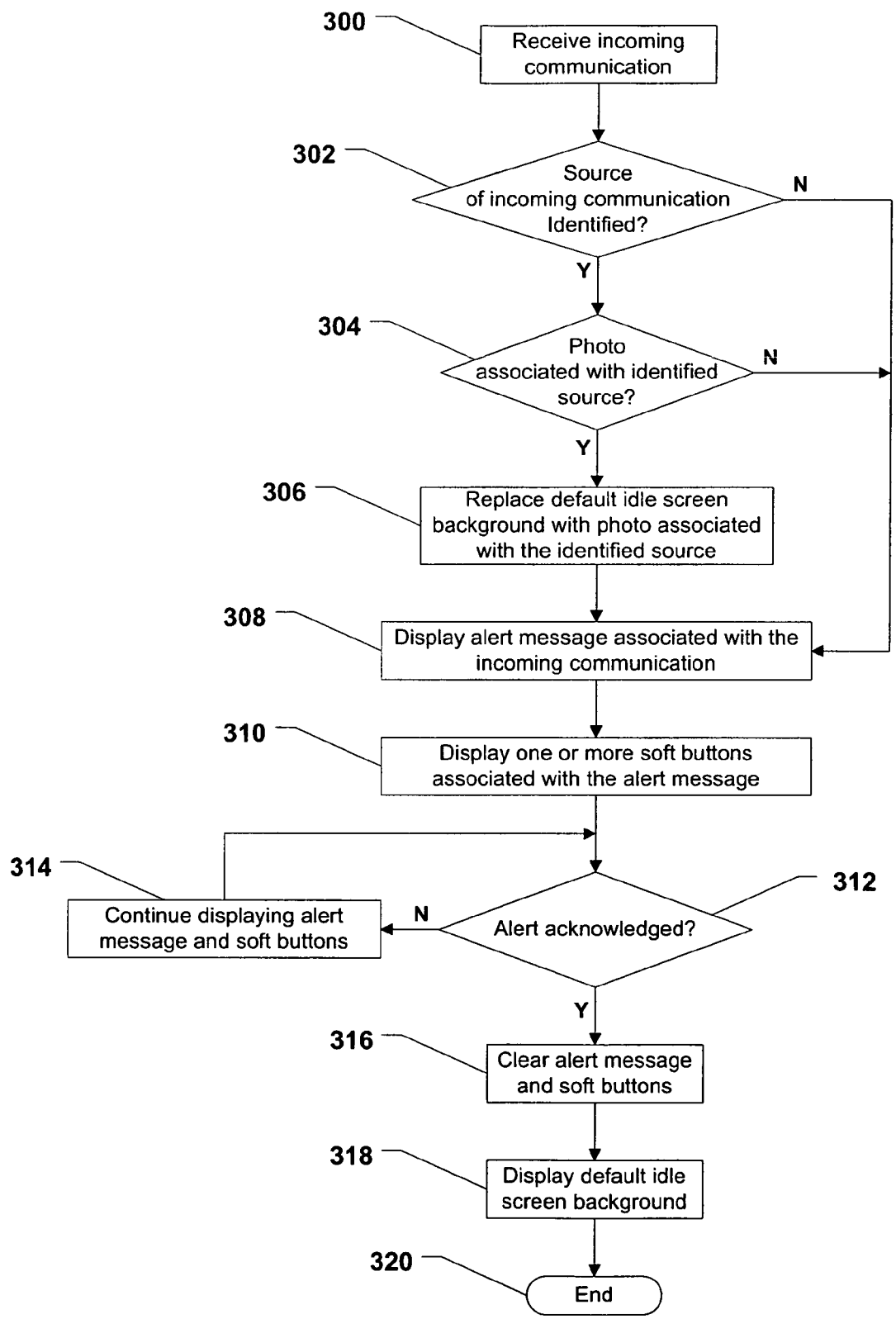
FIG. 3 is a flow chart illustrating a method of alerting a user to an incoming communication.

Referring to FIG. 3, a method of alerting a user of a wireless communications device to an incoming communication is shown and commences at block 300. At block 300, a wireless device receives an incoming communication. In an illustrative embodiment, the incoming communication can be a telephone call, a text message, a picture message, a video message, etc. At decision step 302, a processor within the wireless device determines whether the source of the incoming communication is identified. If so, the method moves to decision step 304 and the processor determines whether a memory coupled to the processor includes a photograph that is associated with the identified source of the incoming communication. If the memory includes a photograph that is associated with the identified source, the method proceeds to block 306 and the processor replaces a default idle screen background with the photograph that is associated with the identified source. Alternatively, the processor can play a video associated with the identified source at the default idle screen. Also, an audible sound associated with an incoming communication can be transmitted to a user, e.g., via a speaker. The method then continues to block 308.

In a particular embodiment, a user can store one or more photographs within the memory of the wireless communications device. One or more telephone numbers, email addresses, and text messaging addresses, can also be stored within the memory of the wireless communications device. Further, a user can associate a photograph with a telephone number, an email address, or a text messaging address. Alternatively, a user can associate a telephone number, an email address, or a text messaging address with a photograph. As such, when a source of an incoming communication is identified the wireless device can search the memory therein with the identified source, e.g., a telephone number, an email address, or a text messaging address, in order to determine if a photograph is associated with the identified source.

Returning to decision step 302, if the processor cannot identify the source of an incoming communication, the method moves directly to block 308. Further, returning to decision step 304, if the processor cannot locate a photograph that is associated with an identified source of an incoming communication, the method also moves directly to block 308.

At block 308, the processor can display an alert message that is associated with the incoming communication. For example, the alert message can indicate that the wireless device is receiving an incoming telephone call, an incoming text message, an incoming email message, an incoming picture message, or an incoming video message.

Additionally, the alert message can indicate that the wireless device has missed a telephone call, a text message, a picture message, or a video message. Also, the alert message can indicate that the user has a voice mail. In a particular embodiment, the alert message can be displayed over a portion of the photograph that is associated with the identified source of the incoming communication. Conversely, the alert message can be displayed over the default idle screen background, e.g., if the processor cannot identify the source of an incoming communication or if the processor can not locate a photograph that is associated with an identified source of an incoming communication.

Proceeding to block 310, the processor displays one or more soft buttons that are associated with an alert message. The one or more soft buttons can include a yes soft button, a no soft button, a clear soft button, an exit soft button, and other similar soft buttons. In an illustrative embodiment, the alert message and the one or more soft buttons are substantially see-through in order to minimize the portion of the photograph that is obscured by the alert and the one or more soft buttons displayed thereon. At decision step 312, the processor determines whether the alert is acknowledged.

In a particular embodiment, the alert can be acknowledged by a user ending a communication session that results from the user answering the incoming communication.

Also, the alert can be acknowledged by a user selecting a cancel soft button or an exit soft button. The alert can be acknowledged by a user pressing an end button, a clear button, or an okay button at a keypad of the wireless device. Further, the alert can be acknowledged by the user viewing information that is associated with a missed communication, e.g., a time or date stamp. If the alert is not acknowledged, the method proceeds to block 314 and the processor continues displaying the alert message and the associated soft buttons. On the other hand, if the alert is acknowledged, the method moves to block 316 and the processor clears the alert message and the associated soft buttons. At block 318, the processor displays the default idle screen background. The method then ends at state 320.

Figure 4:
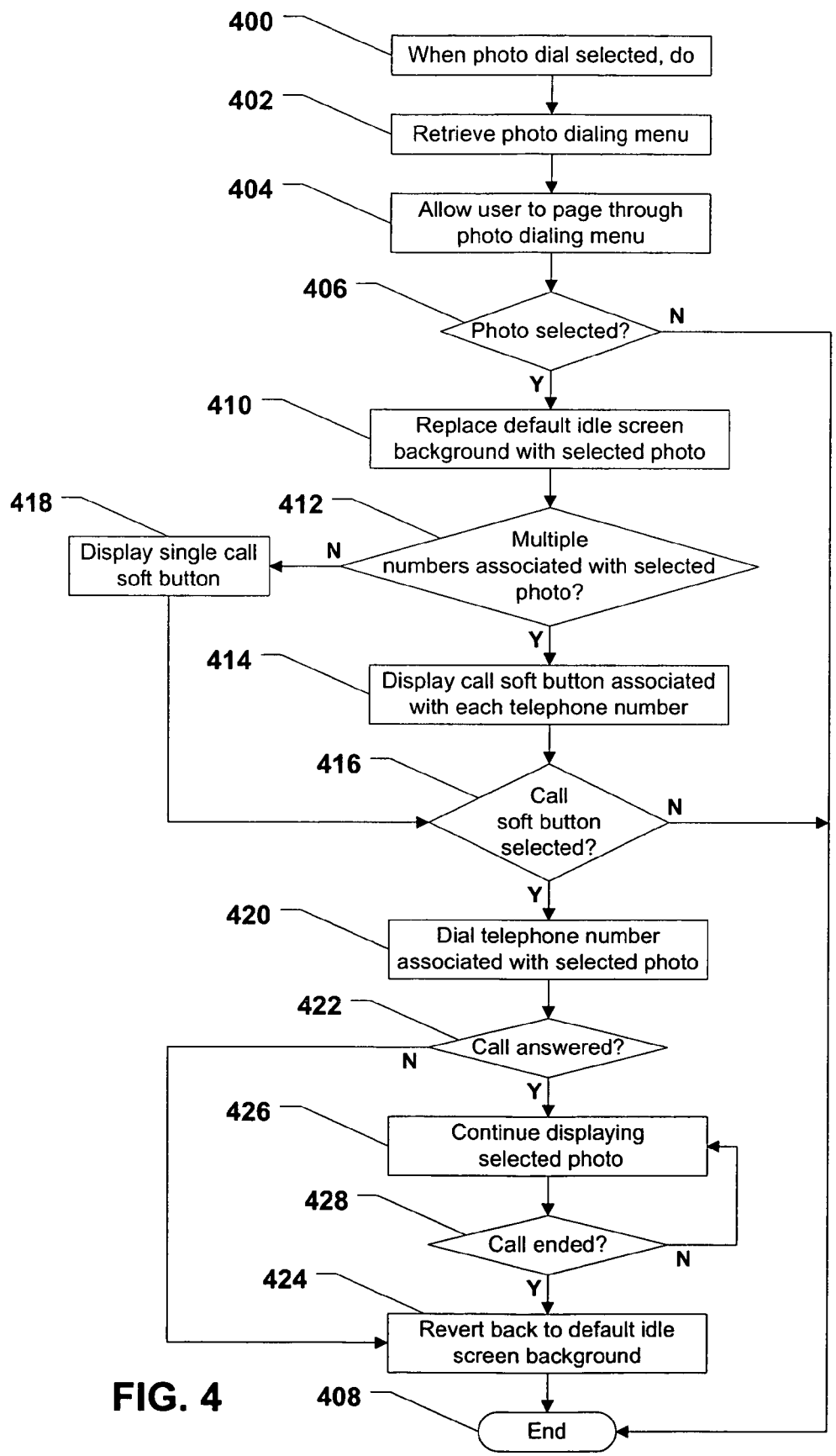
FIG. 4 is a flow chart illustrating a method of establishing a telephone call.

FIG. 4 illustrates a method of establishing communication with a telephone device. In an exemplary, non-limiting embodiment, the telephone device is a wireless telephone device, a plain old telephone service (POTS) telephone device, a voice over Internet protocol (VoIP) device, or a similar device. Beginning at block 400, when a photograph dialing option is selected at a wireless device, the following steps are performed. At block 402, a processor within the wireless device retrieves a photograph dialing menu, e.g., from a memory that is coupled to the processor. Further, at block 404, a user is allowed to page through the photograph dialing menu, e.g., using a multi-position button at the keypad of the wireless device.

Moving to decision step 406, the processor determines whether a photograph is selected. In a particular embodiment, a user can select a photograph by pressing an okay button at the keypad of the wireless device. If a photograph is not selected, the method ends at state 408. On the other hand, if a photograph is selected, the method continues to block 410 and the processor replaces a default idle screen background with the selected photograph. At decision 412, the processor determines whether multiple telephone numbers are associated with selected photograph. If so, the method moves to block 414 and the processor displays a call soft button that is associated with each telephone number. Thereafter, the method proceeds to decision step 416.

Returning to decision step 412, if there is a single telephone number associated with a selected photograph, the method moves to block 418 and the processor displays a single call soft button that is associated with the single telephone number. The method then moves to decision step 416.

At decision step 416, the processor determines whether a call soft button is selected. If not, the method ends at state 408. Conversely, if a call soft button is selected, the method continues to block 420 and the processor dials the telephone number associated with the selected call soft button associated with the selected photograph. Proceeding to decision step 422, the processor determines whether the call is answered. If the call is not answered, the method moves to block 424 and the processor reverts back to the default idle screen background. Then, the method ends at state 408.

Returning to decision step 422, if the call is answered, the method continues to block 426 and the processor continues displaying the selected photo. At decision step 428, the processor determines whether the call is ended. If not, the method returns to block 426 and the processor continues displaying the selected photo. If the call is ended, the method moves to block 424 and the processor reverts back to displaying the default idle screen background. The method then ends at state 408.

Figure 5:
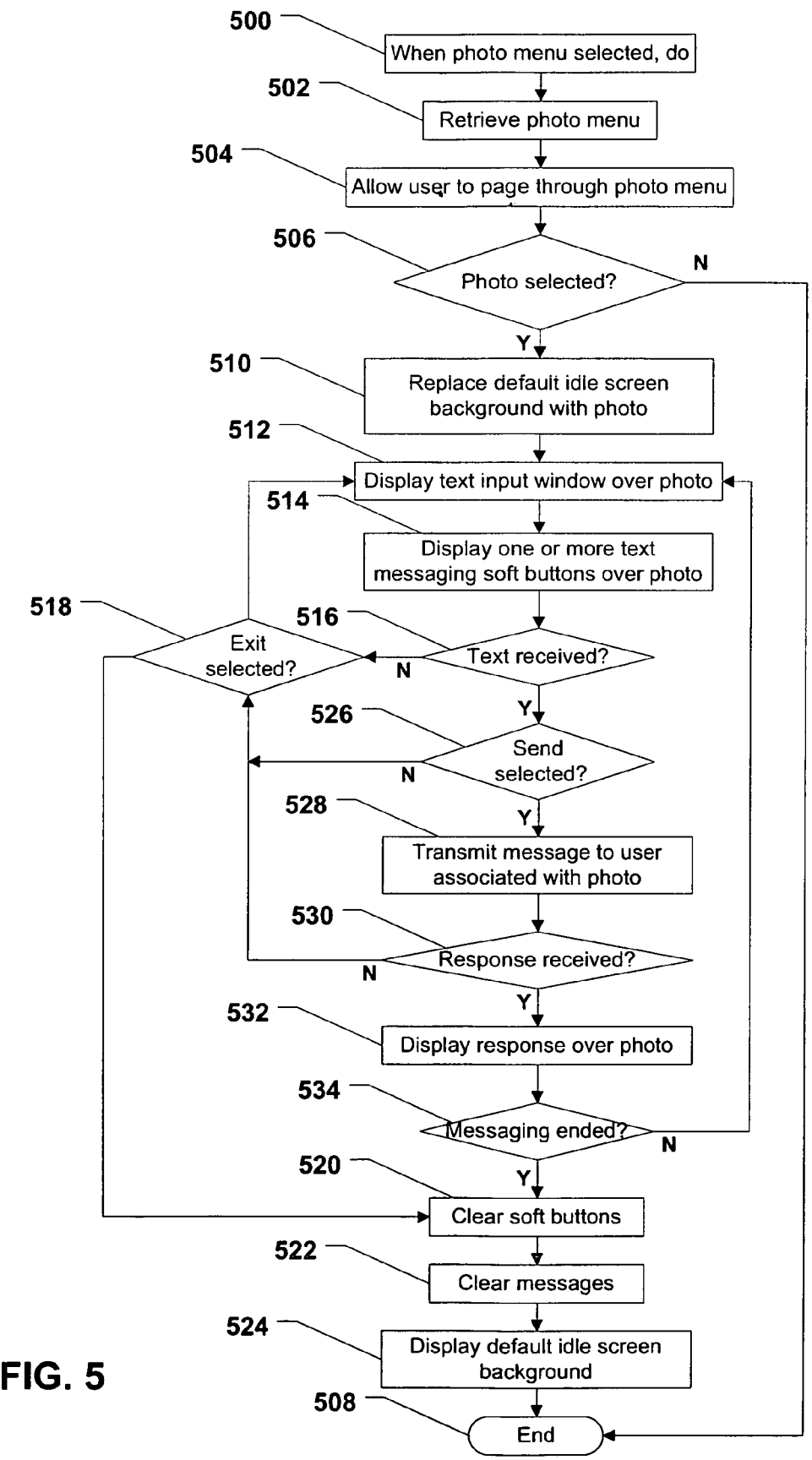
FIG. 5 is a flow chart illustrating a method of sending a text message.

Referring to FIG. 5, an alternative method of establishing communication with another device is shown. Commencing at block 500, when a photograph menu is selected at a wireless device, the following steps are performed. At block 502, a processor within the wireless device retrieves a photograph menu, e.g., from a memory that is coupled to the processor. At block 504, a user is allowed to page through the photograph menu.

Moving to decision step 506, the processor determines whether a send text message option is selected by a user. If not, the method ends at state 508. On the other hand, when the send text message option is selected, the method proceeds to block 510 and the processor replaces a default idle screen background with the photograph that is displayed when the send text message option is selected. At block 512, the processor displays a text input window over a portion of the photograph. At block 514, the processor also displays one or more text messaging soft buttons over a portion of the photograph.

Proceeding to decision step 516, the processor determines whether text input from the user has been received. If no text input is received, the method moves to decision step 518 and the processor determines whether an exit soft button is selected. If the exit soft button is not selected, the method returns to block 512 and continues as described. Conversely, if the exit soft button is selected, the method moves to block 520 and the processor clears the soft buttons displayed at the wireless device. At block 522, the processor clears one or more messages displayed at the wireless device. Moving to block 524, the processor displays the default idle screen background. The method then ends at state 508.

Returning to decision step 516, when text input is received from the user, the method continues to decision step 526 and the processor determines whether a send soft button is selected by the user. If the send soft button is not selected, the method returns to decision step 518 and continues as described. When the send soft button is selected, the method moves to block 528 and the processor transmits a text message to a user associated with the selected photograph. At decision step 530, the processor determines whether a response is received. If a response is not received, the method returns to decision step 518 and continues as described. On the other hand, if a response is received, the method moves to block 532 and the processor displays the response over the selected photograph.

Continuing to decision step 534, the processor determines whether messaging has ended. If not, the method returns to block 512 and continues as described. Conversely, if the messaging is ended, the method proceeds to block 520 and the processor clears the soft buttons displayed at the wireless device. At block 522, the processor clears one or more messages displayed at the wireless device. Moving to block 524, the processor displays the default idle screen background. The method ends at state 508.

Figure 6:
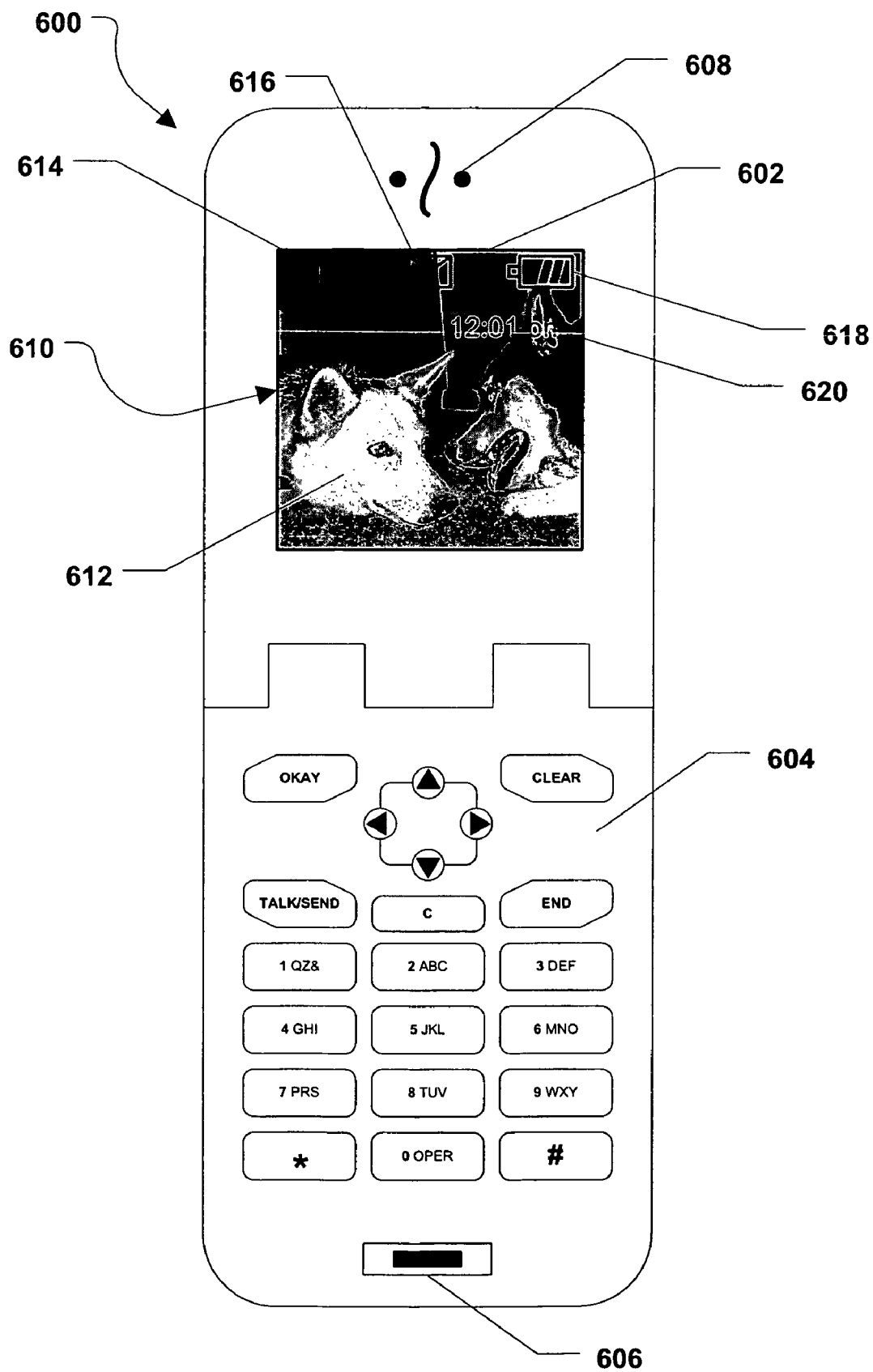
FIG. 6 is a diagram of a wireless device showing an idle screen graphical user interface.

Referring to FIG. 6, a wireless device is shown and is generally designated 600.

As shown, the wireless device 600 includes a display 602 and a keypad 604. Further, the wireless device 600 can include a microphone 606 and a speaker 608. A user can speak into the microphone 606 and listen to incoming audio via the speaker 608. FIG. 6 further illustrates a first exemplary graphical user interface (GUI) 610 that can be presented to a user via the display 602 of the wireless device 600. As shown, the first GUI 610 can include a default idle screen background 612, i.e., a wallpaper. A signal strength indicator 614, a voicemail indicator 616, and a battery level indicator 618 can be displayed over the default idle screen background 612. Also, a time and date indictor 620 can be displayed over the default idle screen background 612.

Figure 7:
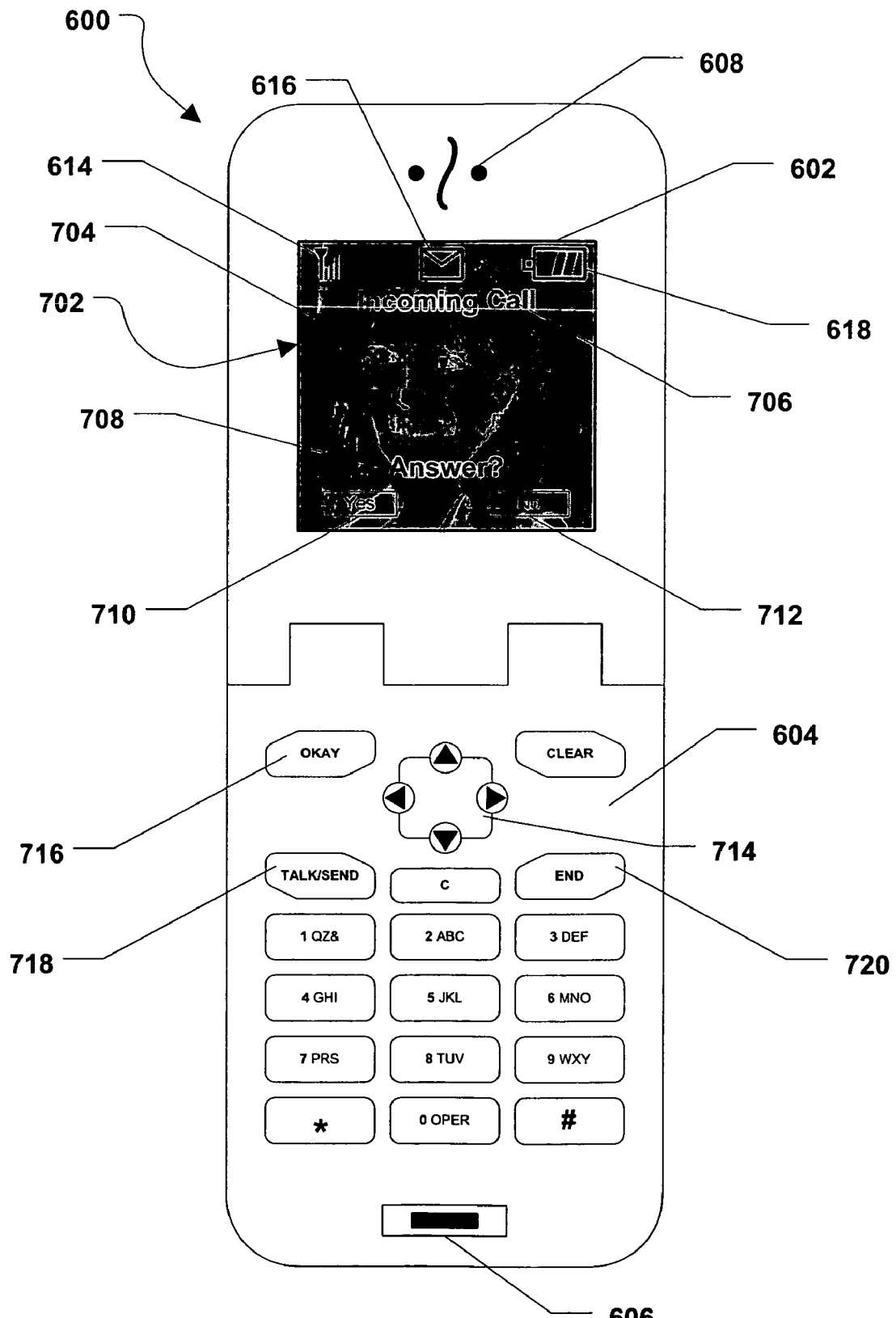
FIG. 7 is a diagram of a wireless device showing a graphical user interface to alert a user of an incoming telephone call.

FIG. 7 illustrates a second exemplary GUI, designated 702, that can be used to alert a user of an incoming call. In a particular embodiment, when the wireless device receives a telephone call, identifies the caller, and locates a photograph associated with the caller and stored within the wireless device, the wireless device 600 can display the photograph 704 that is associated with the identified caller. In a particular embodiment, the photograph 704 can remain displayed by the wireless device after the caller answers the incoming call. After the call is over, the wireless device can revert back to the default idle screen background 612, shown in FIG. 6.

As indicated in FIG. 7, the second GUI 702 can include an incoming call alert 706 that is displayed over the photograph 704. Further, the second GUI 702 can include an answer prompt 708, a yes soft button 710, and a no soft button 712. A user can choose to answer an incoming call by selecting the yes soft button 710, e.g., by manipulating a multi-directional button 714 at the keypad 604. Alternatively, the user can choose to answer the incoming call by toggling an okay button 716 or a talk/send button 718 at the keypad 604. Once the user answers the call, the photograph 704 can remain at the display 602 until the user ends the call, e.g., by toggling an end button 720 at the keypad 604.

Figure 8:
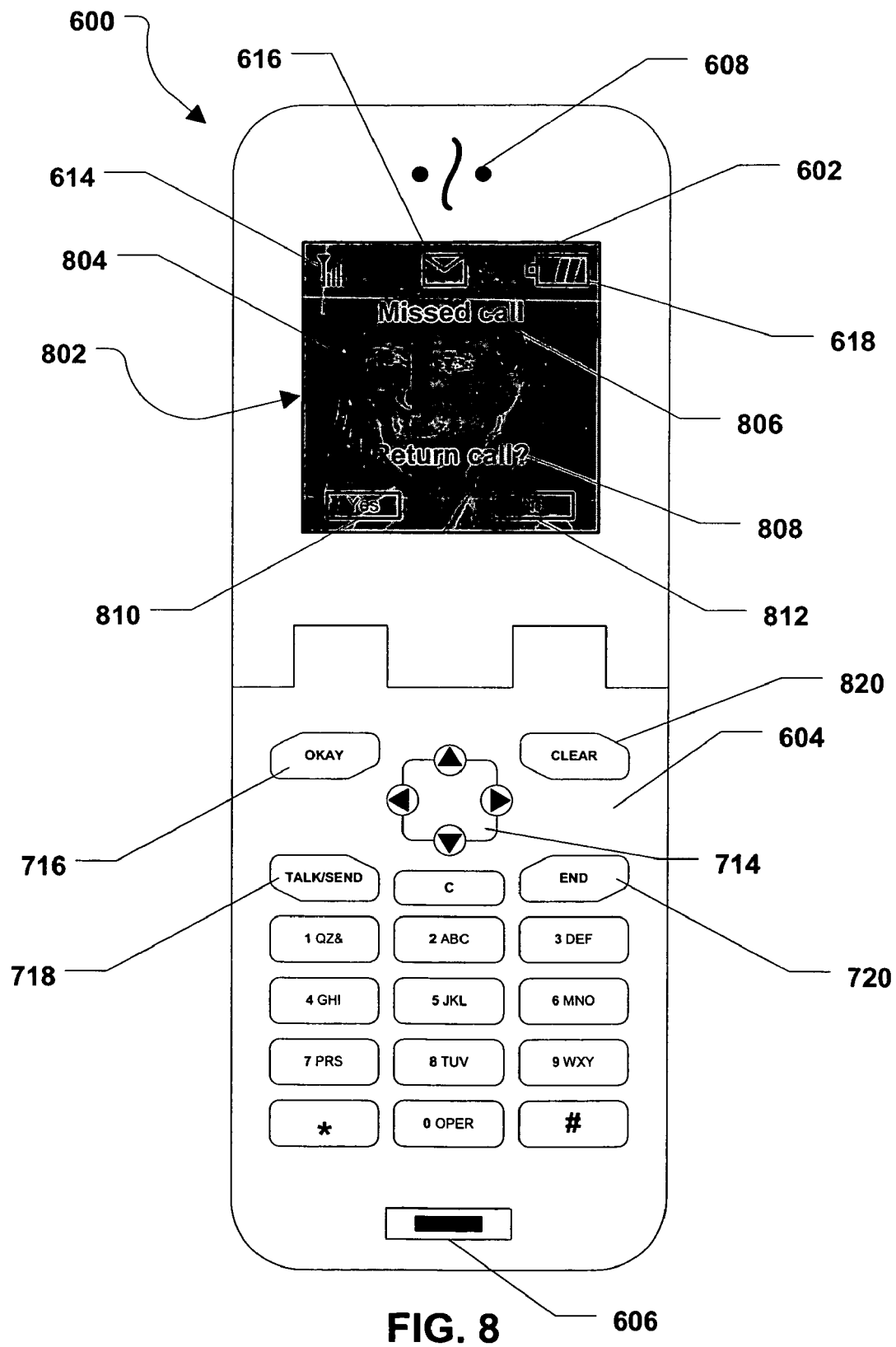
FIG. 8 is a diagram of a wireless device showing a graphical user interface to alert a user of a missed telephone call.

FIG. 8 illustrates a third exemplary GUI 802 that can be presented to a user when a telephone call is missed. As depicted in FIG. 8, the third GUI 802 can include a photograph 804 that is displayed at the display 802 when the source of the missed telephone call can be identified and the wireless device includes a photograph that is associated with the source of the missed telephone call. Further, the third GUI 802 can include a missed call alert 806 that is displayed over the photograph 804.

Additionally, as shown in FIG. 8, the third GUI 802 can include a return call prompt 808, a yes soft button 810, and a no soft button 812. A user can choose to return a telephone call to the source of the missed telephone call by selecting the yes soft button 810, e.g., by manipulating the multi-directional button 714 at the keypad 604. Alternatively, the user can choose to return a telephone call to the source of the missed telephone call by toggling the okay button 716 or the talk/send button 718 at the keypad 604. Additionally, the user can press a clear button 820 at the keypad to clear the missed call alert 806. The photograph 804 can be displayed at the display 602 until the user acknowledges the missed call alert 806, e.g., by returning a call to the source of the missed call or by pressing the clear button 820.

Figure 9:
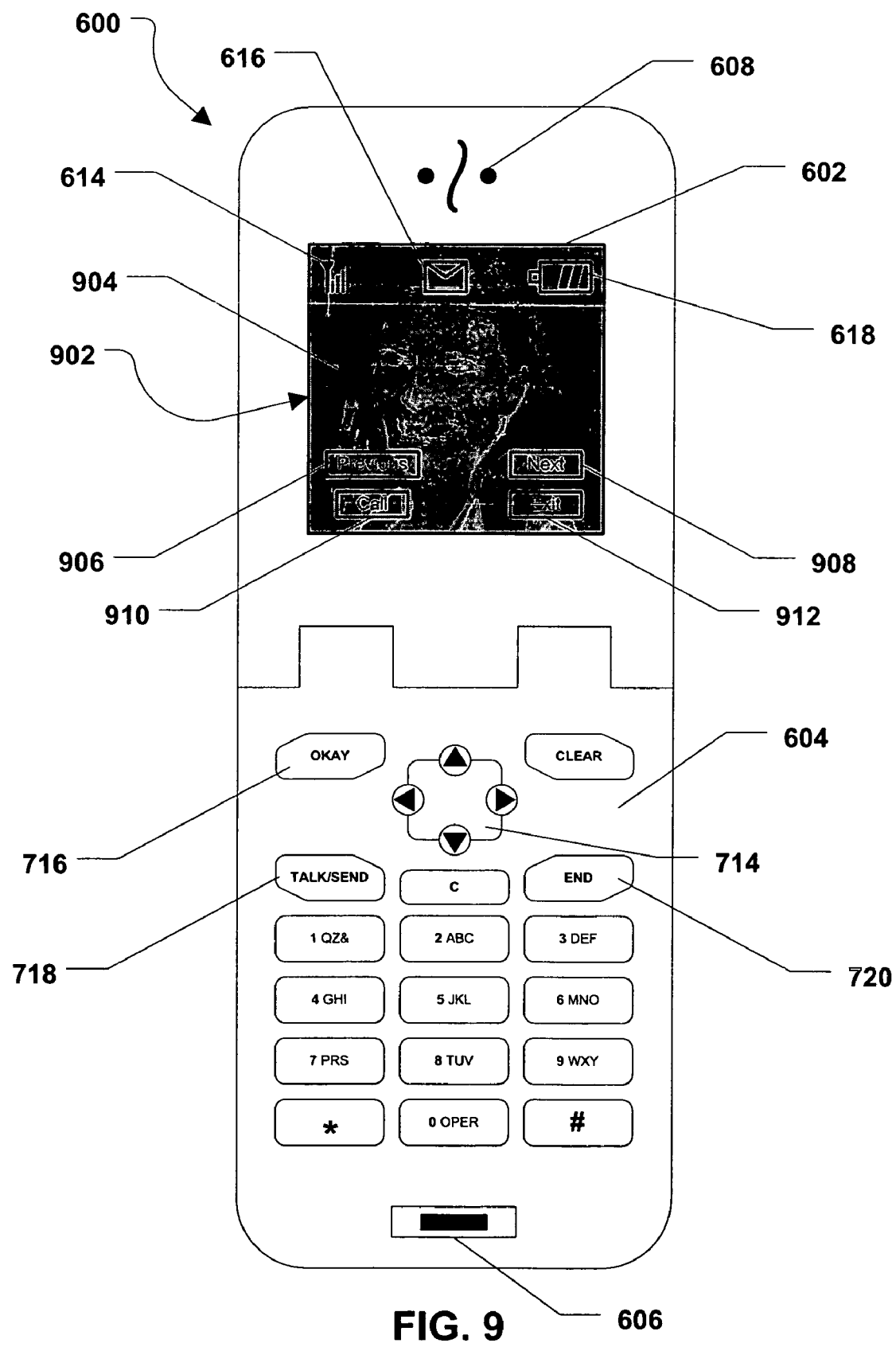
FIG. 9 is a diagram of a wireless device showing a graphical user interface to establish a telephone call.

Referring to FIG. 9, a fourth exemplary GUI 902 associated with a photograph dialing feature of the wireless device 600 is illustrated. In a particular embodiment, the fourth GUI 902 can be used to establish a telephone call to a telephone number that is associated with a photograph that is stored within a memory of the wireless device 600. As indicated the fourth GUI 902 can include at least one photograph 904 that is displayed at the wireless device 600. A previous soft button 906 and a next soft button 908 can be displayed over the photograph 904. In an illustrative embodiment, as shown, one photograph 904 is displayed at a time at the wireless device and a user can page through multiple photographs using the previous soft button 906 and the next soft button 908. In another embodiment, multiple photographs may be displayed at the wireless device at the same time, e.g., in a thumbnail menu.

As illustrated in FIG. 9, the fourth GUI 902 can also include a call soft button 910 and an exit soft button 912. A user can choose to call a telephone number associated with a photograph 904 displayed at the wireless device 600 by selecting the call soft button 910. Alternatively, the user can choose to call the telephone number associated with the photograph 904 by pressing the talk/send button 718 at the keypad 604. Additionally, the user can exit the fourth GUI 902 by selecting the exit soft button 912 or by pressing the end button 720. In a particular embodiment, when the user exits the fourth GUI 902, the first GUI 610 can be presented to the user.

Figure 10:
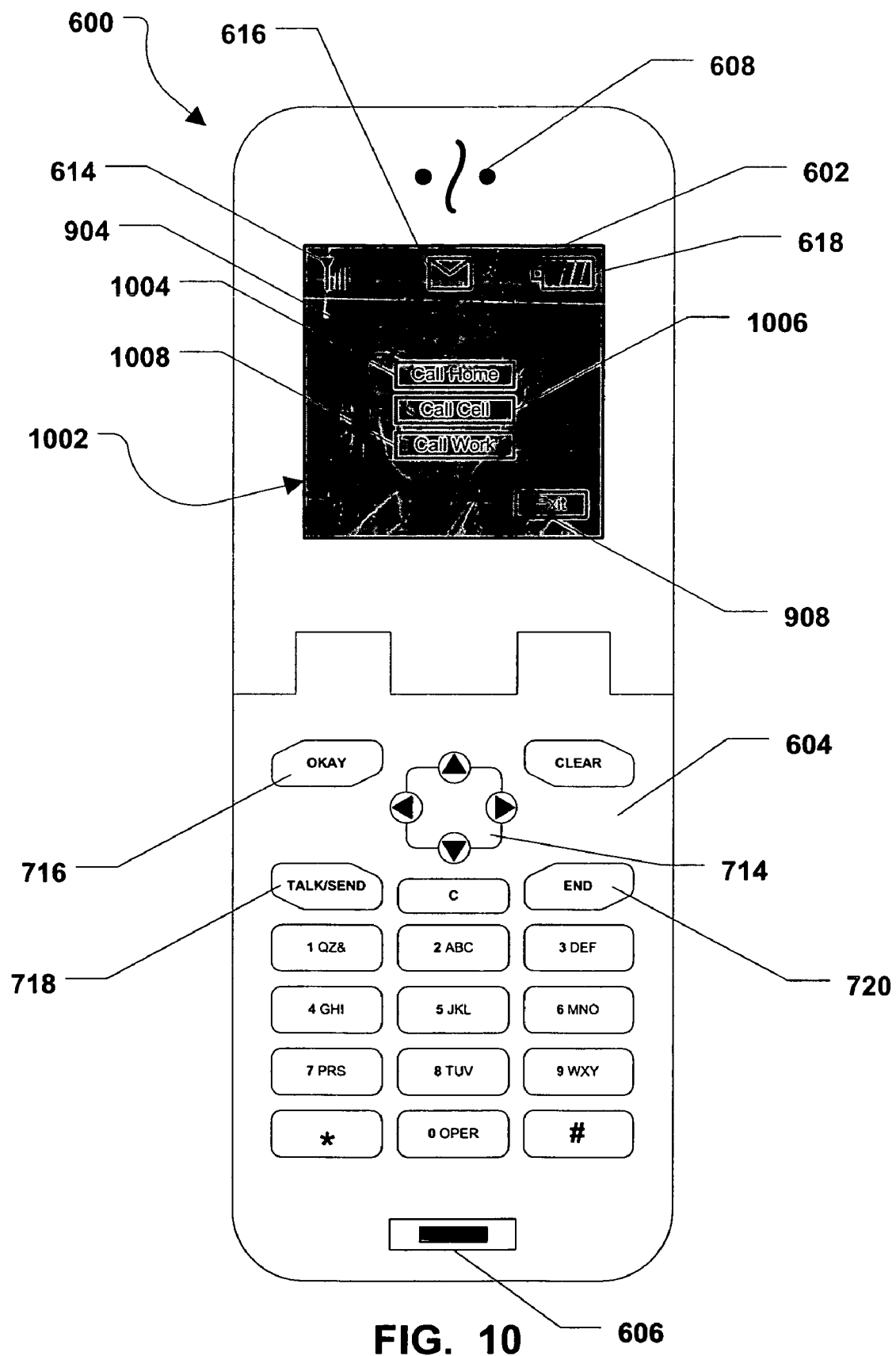
FIG. 10 is a diagram of a wireless device showing another graphical user interface to establish a telephone call.

In the event that multiple telephone numbers are associated with a particular photograph 904, when a user selects an option to call the person associated with the photograph 904, a fifth exemplary GUI 1002 can be presented to the user at the display 602 of the wireless device 600. As shown in FIG. 10, the fifth GUI 1002 can include a call home soft button 1004, a call cell soft button 1006, and a call work soft button 1008. Each of these soft buttons 1004, 1006, 1008 is displayed over the photograph 904 and can be selected by the user. Further, in a particular embodiment, the call home soft button 1004 can be selected to establish a call to a home telephone number associated with the photograph 904, or a person depicted in, or associated with, the photograph 904. Also, the call cell soft button 1006 can be selected to establish a call to a wireless telephone number associated with the photograph 904, or a person depicted in, or associated with, the photograph 904. The call work soft button 1008 can be selected to establish a call to a work telephone number that is associated with the photograph 904 or a person depicted in, or associated with, the photograph 904.

Figure 11:
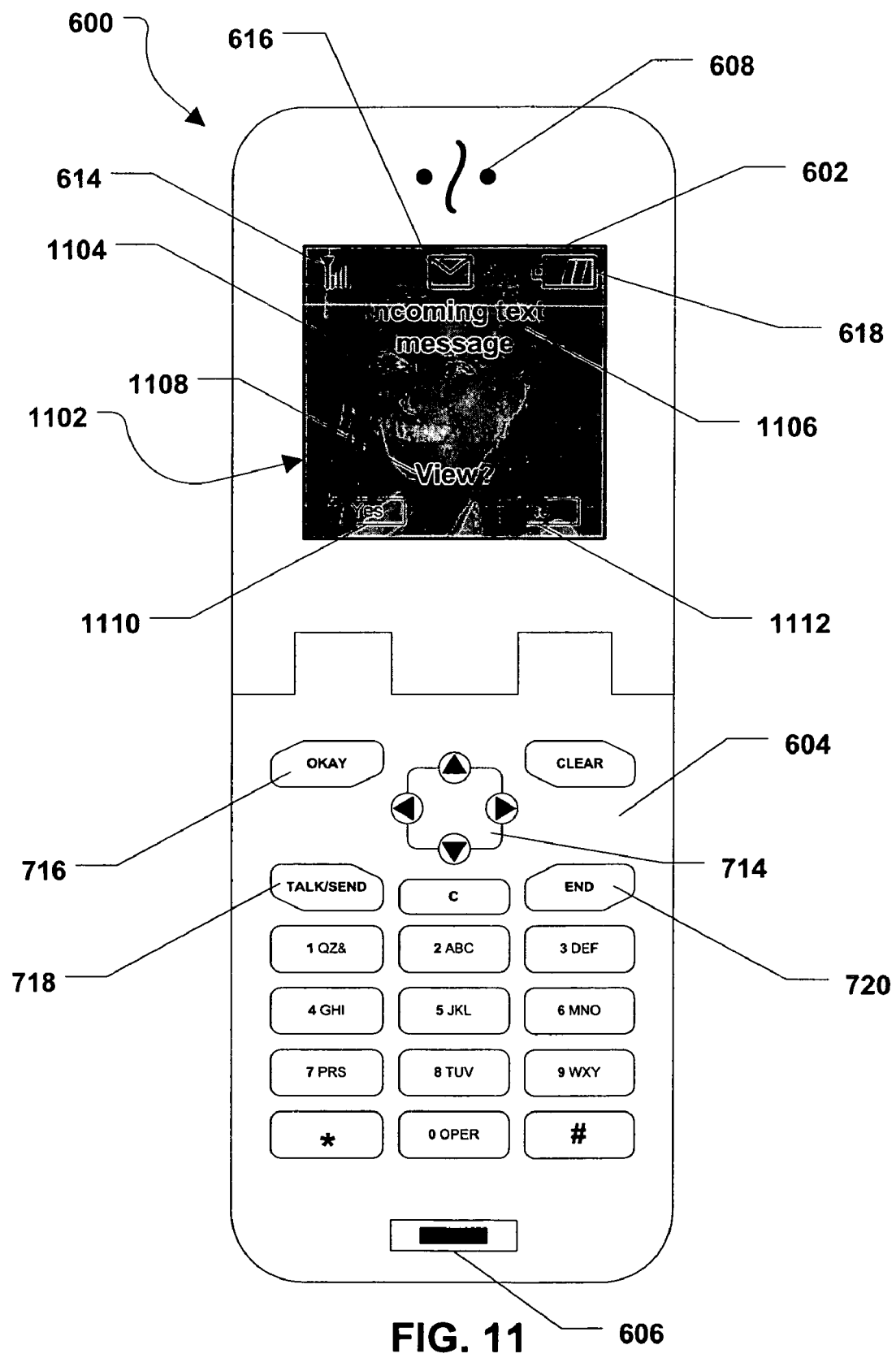
FIG. 11 is a diagram of a wireless device showing a graphical user interface to alert a user of an incoming text message.
Figure 12:
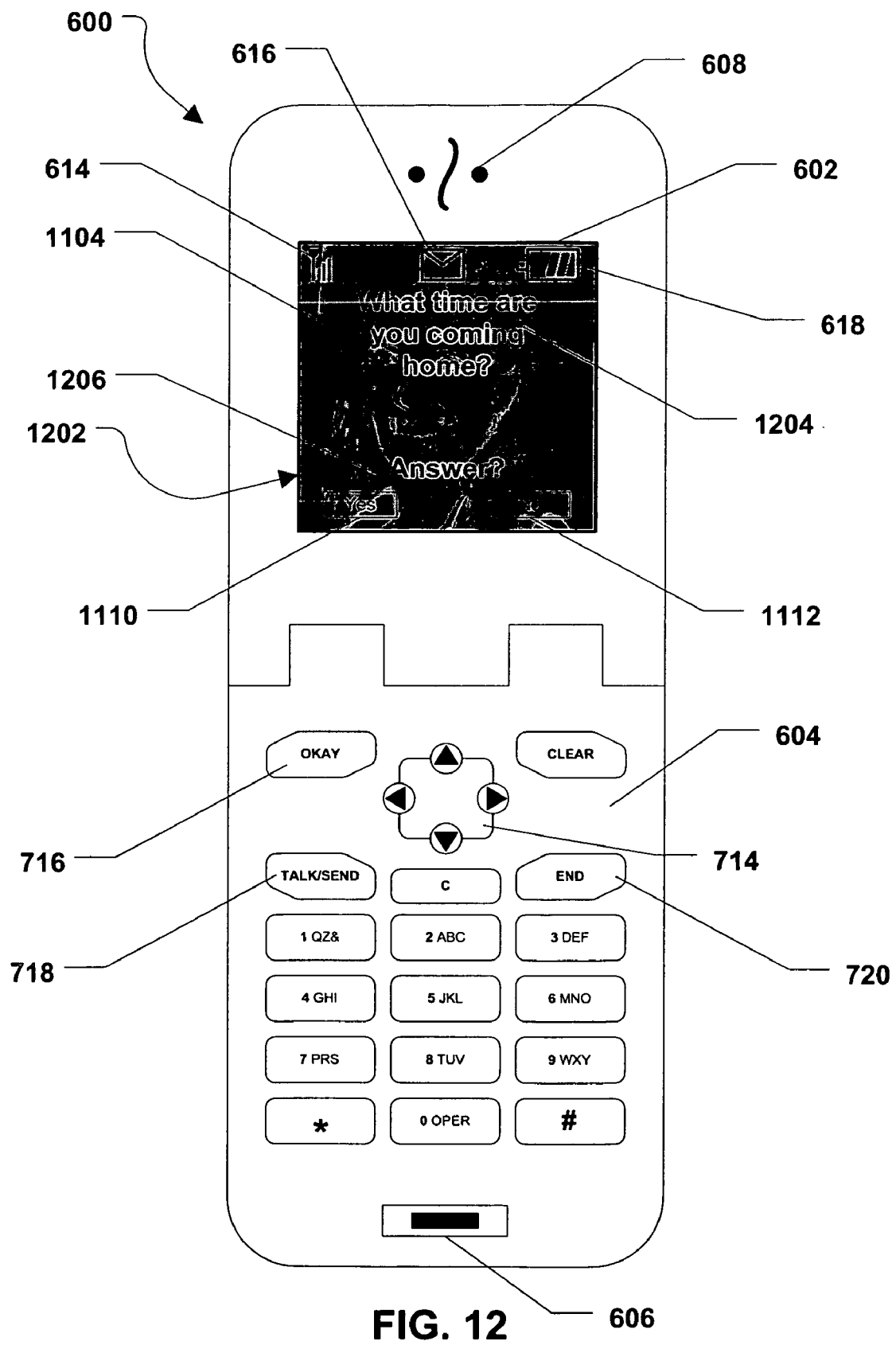
FIG. 12 is a diagram of a wireless device showing a graphical user interface to view to an incoming text message.
Figure 13:
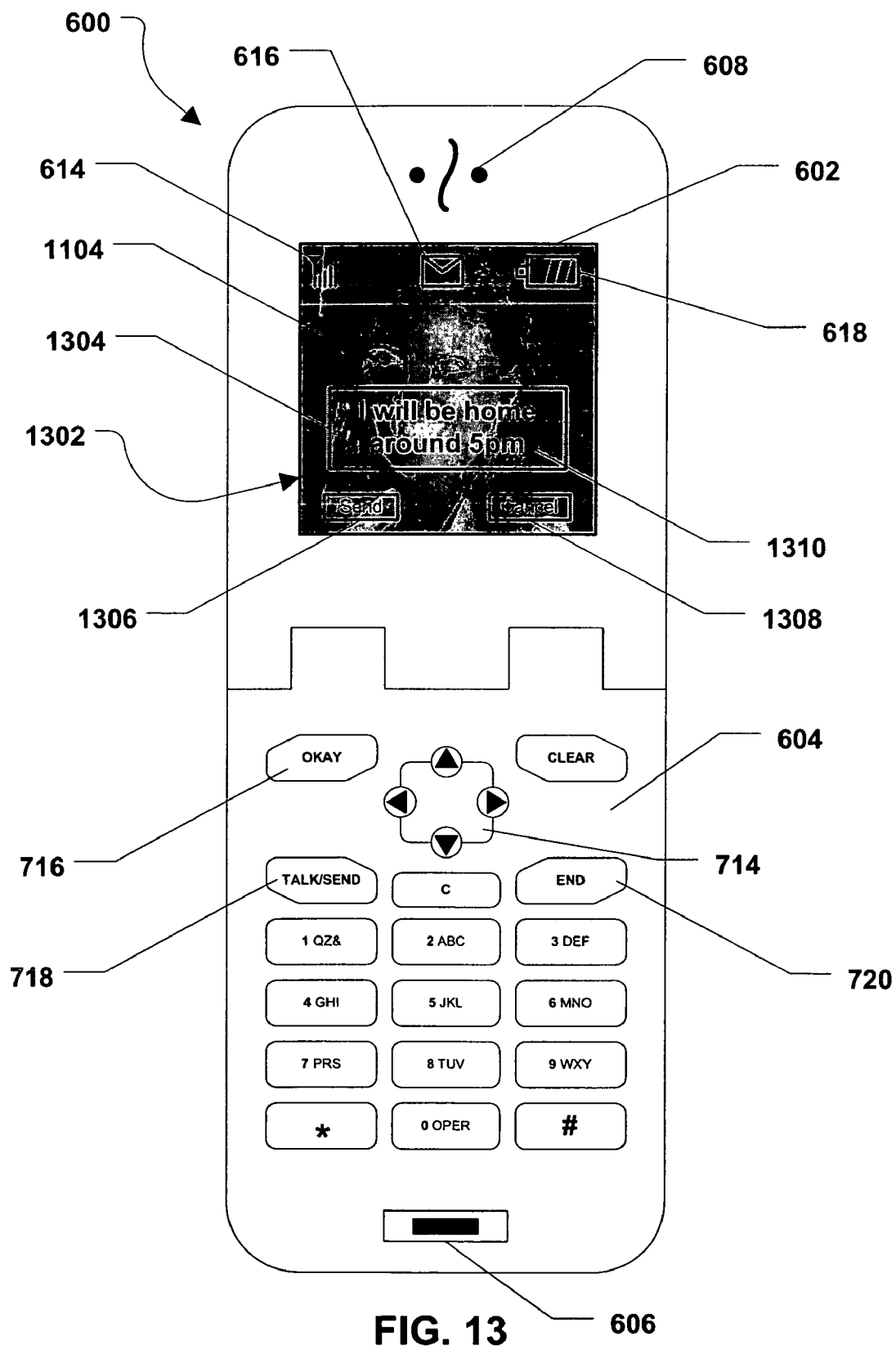
FIG. 13 is a diagram of a wireless device showing a graphical user interface to respond to an incoming text message.

Referring to FIG. 11, a sixth exemplary GUI 1102 is depicted. The sixth GUI 1002 includes a photograph 1104 and an incoming text message alert 1106 that is depicted over the photograph 1104 of the person associated with the incoming text message. Further, the sixth GUI 1102 includes a view prompt 1108, a yes soft button 1110, and a no soft button 1112. A user can choose to view the incoming text message by selecting the yes soft button 1110 or by pressing the okay button 716 at the keypad. The photograph 110 remains displayed at the wireless device 600 until the user acknowledges or otherwise clears the incoming text message alert 1106. In a particular embodiment, if the user chooses to view the incoming text message, the incoming text message alert can be cleared after the user ends the particular text session. Once the incoming text message alert 1106 is cleared the wireless device 600 can revert back to the first GUI 610 and display the default idle screen background 612.

When a user chooses to view an incoming text message, a seventh exemplary GUI 1202 can be displayed at the wireless device 600. The seventh GUI 1202 can include a text message 1204 that is displayed over the photograph 1104 and an answer prompt 1206. A user can choose to answer the text message 1204 by selecting the yes soft button 1110. Alternatively, a user can choose not to answer the text message 1204 by selecting the no soft button 1112.

In a particular embodiment, if the user chooses to answer the text message 1204, an eighth exemplary GUI 1302 can be displayed at the wireless device 600. The eighth GUI 1204 can include a text input window 1304, a send soft button 1306, and an exit soft button 1308 that are displayed over the photograph 1104 that is associated with the incoming text message. A user can input a text message 1310 into the text input window 1304 by manipulating one or more of the buttons on the keypad 604 of the wireless device 600. Further, the user can transmit the text message 1310 by selecting the send soft button 1308 or by pressing the talk/send button 718. Moreover, the user can exit the eighth GUI 1204 by selecting the exit soft button 1308. In a particular embodiment, when the exit soft button 1308 is selected, the wireless device can revert back to the first GUI 610 shown in FIG. 6.

With the configuration of structure disclosed herein, the systems and methods disclosed provide display of an alert and a photograph that are associated with an incoming communication. The system and method can also display a video associated with an incoming communication. Further, an audible sound can be assigned to particular alerts and played for a user when incoming communications are received. The audible sounds can be customized for particular alerts.

Additionally, the systems and methods provide a way to establish communication with another user via a photograph menu. In a particular embodiment, the GUIs described herein can be separate GUIs. Alternatively, the GUIs described herein can be part of a single GUI that encompasses all of the features described in conjunction with each of the GUIs. Further, in a particular embodiment, as indicated in the FIGs., the elements that are displayed over a photograph at the wireless device are substantially see through, or substantially clear, in order to reduce blocking of the photograph that is displayed at the wireless device.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device or a user terminal. In the alternative, the processor and the storage medium may reside as discrete components in a wireless device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method of providing an alert of an incoming communication, comprising:
   receiving an incoming communication at a wireless device;
   determining whether the wireless device has access to a photograph associated with an identified source of the incoming communication;
   displaying the photograph associated with the identified source;
   displaying an alert message associated with the incoming communication; and
   displaying at least one soft button over the photograph, wherein at least a portion of the at least one soft button is substantially transparent, and wherein the at least one soft button is configured to identify one or more responses to the alert message.

2. The method of claim 1, wherein a default idle screen background is replaced with the photograph and the alert message.

3. The method of claim 1, wherein the alert message is displayed over at least a portion of the photograph.

4. The method of claim 1, wherein the alert message indicates that the incoming communication is received.

5. The method of claim 1, wherein the alert message indicates that the incoming communication has been missed.

6. The method of claim 1, wherein the incoming communication includes at least one of the following: a telephone call, a text message, an email message, a picture message, or a video message.

7. The method of claim 1, wherein the at least one soft button is a yes soft button, a no soft button, a send soft button, a cancel soft button, an exit soft button, a call soft button, a call home soft button, a call cell soft button, or a call work soft button.

8. The method of claim 1, further comprising determining whether the alert message is acknowledged.

9. The method of claim 8, wherein the alert message is acknowledged by answering the incoming communication.

10. The method of claim 8, wherein the alert message is acknowledged by viewing the incoming communication.

11. The method of claim 8, wherein the alert message is acknowledged by viewing information associated with a missed incoming communication.

12. The method of claim 8, further comprising:
    clearing the alert message after the alert message is acknowledged;
    clearing the at least one soft button; and
    displaying a default idle screen background.

13. A wireless device, comprising:
    a processor; and
    a non-transitory computer readable storage medium accessible to the processor the non-transitory computer readable storage medium having stored thereon processor-executable instructions configured to cause the processor to perform operations comprising:
       receiving an incoming communication at a wireless device;
       determining whether the wireless device has access to a photograph associated with an identified source of the incoming communication;
       displaying the photograph associated with the identified source;
       displaying an alert message associated with the incoming communication; and
       displaying at least one soft button over the photograph, wherein at least a portion of the at least one soft button is substantially transparent, and wherein the at least one soft button is configured to identify one or more responses to the alert message.

14. The wireless device of claim 13, wherein the non-transitory computer-readable storage medium has stored thereon further processor-executable instructions configured to cause the processor to perform operations further comprising:
    replacing a default idle screen background with the photograph and the alert message.

15. The wireless device of claim 13, wherein the non-transitory computer-readable storage medium has stored thereon further processor-executable instructions configured to cause the processor to perform operations further comprising:
    displaying the alert message over at least a portion of the photograph.

16. The wireless device of claim 13, wherein the instructions to display an alert message further comprises instructions to indicate that the incoming communication is received.

17. The wireless device of claim 13, wherein the instructions to display an alert message further comprises instructions to indicate that the incoming communication has been missed.

18. The wireless device of claim 13, wherein the instructions to receive an incoming communication comprises instructions to receive at least one of the following: a telephone call, a text message, an email message, a picture message, or a video message.

19. The wireless device of claim 13, wherein the instructions to display at least one soft button comprises instructions to display at least one of the following: a telephone call, a text message, an email message, a picture message, or a video message.

20. The wireless device of claim 13, wherein the non-transitory computer-readable storage medium has stored thereon further processor-executable instructions to determine whether the alert message is acknowledged.

21. The wireless device of claim 19, wherein the non-transitory computer-readable storage medium has stored thereon further processor-executable instructions configured to cause the processor to perform operations further comprising:
    clearing the alert message after the alert message is acknowledged;
    clearing the at least one soft button; and
    displaying a default idle screen background.

22. A non-transitory computer-readable storage medium having stored thereon processor-executable instructions configured to cause a processor of a wireless device to perform operations comprising:
    receiving an incoming communication at a wireless device;
    determining whether the wireless device has access to a photograph associated with an identified source of the incoming communication;
    displaying the photograph associated with the identified source;
    displaying an alert message associated with the incoming communication; and
    displaying at least one soft button over the photograph, wherein at least a portion of the at least one soft button is substantially transparent, and wherein the at least one soft button is configured to identify one or more responses to the alert message.

23. A wireless device, comprising:
    means for receiving an incoming communication at a wireless device;
    means for determining whether the wireless device has access to a photograph associated with an identified source of the incoming communication;
    means for displaying the photograph associated with the identified source;
    means for displaying an alert message associated with the incoming communication; and
    means for displaying at least one soft button over the photograph, wherein at least a portion of the at least one soft button is substantially transparent, and wherein the at least one soft button is configured to identify one or more responses to the alert message.

24. The wireless device of claim 23, further comprising means for replacing a default idle screen background with the photograph and the alert message.

25. The wireless device of claim 23, further comprising means for displaying the alert message over at least a portion of the photograph.

26. The wireless device of claim 23, wherein means for displaying an alert message further comprises means for indicating that the incoming communication is received.

27. The wireless device of claim 23, wherein means for displaying an alert message further comprises means for indicating that the incoming communication has been missed.

28. The wireless device of claim 23 wherein means for receiving an incoming communication comprises means for receiving at least one of the following: a telephone call, a text message, an email message, a picture message, or a video message.

29. The wireless device of claim 23, further comprising means for determining whether the alert message is acknowledged.

30. The wireless device of claim 28, further comprising:
    means for clearing the alert message after the alert message is acknowledged;
    means for clearing the at least one soft button; and
    means for displaying a default idle screen background.

31. A method of providing an alert of an incoming communication, comprising:
    receiving the incoming communication at a wireless device;
    determining whether the wireless device has access to a video associated with an identified source of the incoming communication;
    displaying the video associated with the identified source;
    displaying an alert message associated with the incoming communication; and
    displaying at least one soft button over the video, wherein at least a portion of the at least one soft button is substantially transparent, and wherein the at least one soft button is configured to identify one or more responses to the alert message.

32. The method of claim 31, wherein a default idle screen background is replaced with the video and the alert message.

33. The method of claim 31, further comprising playing an audio sound associated with the alert message.

* * * * *